July 26, 1932.  J. A. MAHR  1,869,205
FOLDING BABY CARRIAGE
Filed Dec. 12, 1928  5 Sheets-Sheet 2

Inventor
Julius A. Mahr
By his Attorneys
Merchant and Kilgore

Patented July 26, 1932

1,869,205

UNITED STATES PATENT OFFICE

JULIUS A. MAHR, OF MINNEAPOLIS, MINNESOTA, ASSIGNOR TO INVENTORS' PATENT HOLDING COMPANY, OF MINNEAPOLIS, MINNESOTA, A CORPORATION OF SOUTH DAKOTA

FOLDING BABY CARRIAGE

Application filed December 12, 1928. Serial No. 325,411.

My present invention relates to a folding baby carriage and has for its object the provision of such a carriage that is of lightweight, durable, strong, easy to fold or set up and having an artistic appearance. The baby carriage when folded is compact, occupies little space and may be easily carried into and out of buildings, on elevators, up and down stairs, into and out of vehicles, such as automobiles, street cars, trains, boats and the like. In large automobiles the baby carriage may be set up back of the front seat and used or in small automobiles the chassis may be left folded and the body suspended in an operative position from relatively fixed parts of the automobile body. The baby carriage may also be set up for use in a train between two of the seats and it may also be set up and used on a boat.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 18 is a detail view in plan of the brake with a portion of the body support and coupling, on which it is mounted, sectioned on the line 18—18 of Fig. 14;

The chassis of the improved folding baby carriage includes a pair of parallel tubular side bars 30 that are cambered both upwardly and inwardly. On each end of each side bar 30 is a coupling comprising pressed metal inner and outer members 31 and 32, respectively, rigidly connected by rivets to said bar and to each other. The side bars 30 are connected at their ends by a pair of toggle-acting cross-tie bars 33 in a manner and for a purpose that will presently appear.

Figures 10, 11, 12, 13, 14, 15, 16, 17, 19, 20, 21:
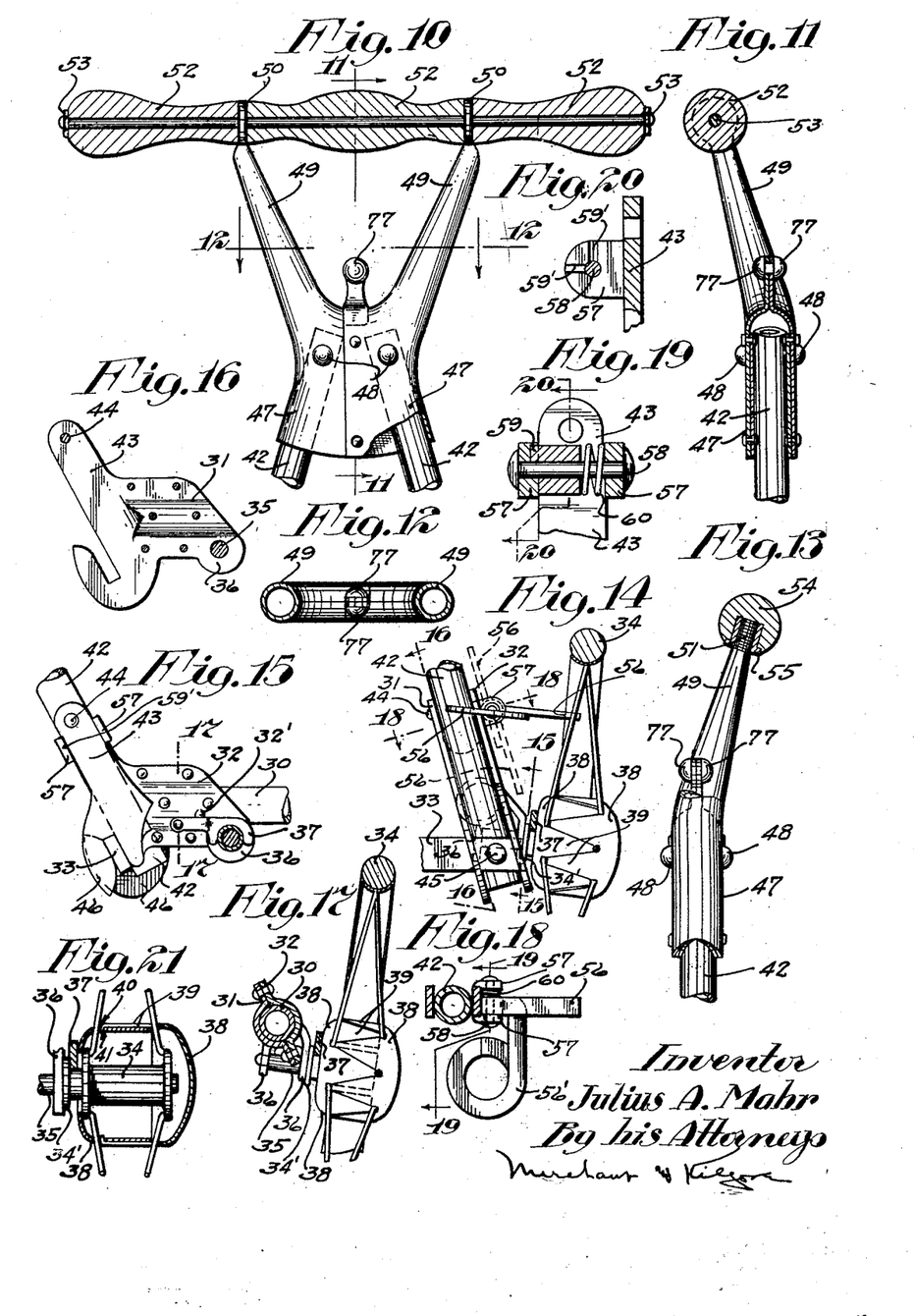
Fig. 10 is a fragmentary detail view with some parts sectioned on the line 10—10 of Fig. 1, on an enlarged scale.
Fig. 11 is a view principally in section taken on the line 11—11 of Fig. 10.
Fig. 12 is a detail view in section taken on the line 12—12 of Fig. 10.
Fig. 13 is a fragmentary detail view with some parts sectioned on the line 13—13 of Fig. 5, on an enlarged scale.
Fig. 14 is a fragmentary view in elevation of the right hand rear wheel and associated parts.
Fig. 15 is a fragmentary detail view of the rear right hand coupling and connected parts with the spindle sectioned on the line 15—15 of Fig. 14 and the brake removed.
Fig. 16 is a face view of the inner member of the rear right hand coupling with the spindle and rivets sectioned substantially on the line 16—16 of Fig. 14.
Fig. 17 is a view corresponding to Fig. 14 with the exception that the side bar and coupling are sectioned on the line 17—17 of Fig. 15.
Fig. 19 is a fragmentary view of the brake mounting with some parts sectioned on the line 19—19 of Fig. 18, on an enlarged scale.
Fig. 20 is a sectional view taken on line 20—20 of Fig. 19.
Fig. 21 is a detail view of one of the hub enclosures with some parts sectioned on the line 21—21 of Fig. 1, on an enlarged scale.

Front and rear pairs of wheels 34 having inner and outer outwardly converging wire spokes and rubber tires are journaled on fixed spindles 35 on the couplings 31 and 32. These spindles 35 project outward of the side bars 30 and their inner end portions are mounted in transversely aligned bores in pairs of depending laterally spaced inner and outer lugs 36 integrally formed with the coupling members 31 and 32. As shown in Fig. 17, the spindle 35 where it passes through the inner lug 36 is circumferentially reduced to form a shoulder that engages the outer face of the inner lug 31 and its inner end is upset against the other face of said lug to rigidly secure the spindle 35 to said coupling and hold the same against endwise movement.

The wheels 34 are releasably held on their spindles 35 by latches 37 pivoted to the outer coupling members 32 for swinging movement transversely of said spindles and extend in front of annular flanges 34' on the hubs of the wheels 34 and holds said hubs with their inner ends against the outer lugs 36 and against outward axial movement therefrom. Stop beads 32' on the coupling members 32 overlie the latches 37 and hold the same in operative positions, see Fig. 15. To release the latches 37 it is only necessary to spring the same laterally to clear the stop beads 32'.

In place of applying a hub cap to each wheel 34 the entire hub and spindle on which it is mounted is surrounded by a box or casing comprising two caps 38 having telescoping flanges 39 encircling said hub between the inner and outer spokes. The flange of the inner cap 38 is provided with deep narrow notches through which the inner spokes of the wheel 34 extend and the flange of the outer cap is provided with deep V-shaped notches through which the outer spokes of the wheel 34 extend. It will be noted that the inner and outer spokes of the wheel 34 are not opposite each other so that the flange 39 of one cap 38 overlap the notches in the flange 39 of the other cap 38 and closing the same except at their inner ends where the spokes pass therethrough.

To lock the two caps 38 together in assembled relation the prongs or body portions of the flange 39 of the outer cap 38 formed by the V-shaped notches in said flange are bent laterally inward to form lugs 40 which extend into lock notches 41 in the flange 39 of the inner cap 38 at the edges of the notches therein. By springing the prongs of the flange 39 of the outer cap 38 outward the lock lugs 40 may be released from the lock notches 41 to permit the separation of the two caps 38 for removal from the wheel 34. These hub boxes or enclosures 38 and 39, not only encase the wheel hubs and close the ends thereof to protect the same from dust and dirt and the escape of grease, but gives the wheels 34 a massive and ornamental appearance which at present is the trend of automobile construction.

Applied to each end of the chassis is a body support 42 comprising a pair of upwardly and outwardly projecting tubular bars and which bars of each pair are in upwardly converging relation and outwardly cambered. The bars of each body support 42 at their lower ends extend between pairs of relatively long upstanding combined bearing and guide flanges 43 on the coupling members 31 and 32 and to the upper ends of which said bars are pivoted at 44 for folding movement onto the side bars 30, as will presently appear. These bearing flanges 43 are integrally formed with the rear ends of the coupling members 31 and 32 and securely hold the body support 42 against movements transversely of the chassis. When the body supports 42 are in operative positions their lower end portions, below the pivots 44, engage the rear ends of the coupling 31 and 32 as stops to limit their outward movements during the unfolding of the chassis.

The cross-tie bars 33 have their outer end portions pivoted at 45 to the rear faces of the bars of the body supports 42 the lower ends thereof for upward buckling movement to fold or draw the side bars 30 toward each other and for downward straightening movement for spreading the side bars 30. The buckling and straightening movements of the cross-tie bars 33 are parallel to the body supports 42. Integrally formed with the lower ends of the flanges 43 of each coupling 31 and 32 is a pair of reversely extended hook-like stop lugs 46 located one on each side of the pivot 45 of the connected cross-tie bar 33. When the cross-tie bars 33 are straight they are interlocked with the lugs 46 which hold said bars against lateral angular movements. Said stop lugs 46 also position the cross-tie bars 33 with their intermediate pivots slightly below dead centers. During the buckling movements of the cross-tie bars 33 they are moved out of interlocking engagement with the stop lugs 46 and at which time the members of said bars extend parallel to and between the lugs 43 of the several pairs. When the cross-tie bars 33 are interlocked with the stop lugs 46 the body supports 42 are securely and rigidly held in upright or operative positions and prevented from folding when supporting a body as will hereinafter appear. This interlocking engagement between the cross-tie bars 33 and stop lugs 46 also connects said bars 33 and the side bars 30 in rigid rectangular arrangement.

The converging upper end portions of the pairs of bars forming each body support 42 extend into the socketed lower end of a coupling 47 and are individually pivoted thereto at 48. Each coupling 47 comprises two sections formed as shown, from pressed metal and connected by rivets. When the cross-tie bars 33 are straight the bars of each body support 42 are held spread and pressed against the tapered internal end walls of the couplings 47 to which they are pivoted and rigidly hold said bars against movements and their pivots 48 and the couplings 47 against movement on said pivots and thereby rigidly connect said bars at their upper ends and the couplings 47. Each coupling 47 is bifurcated to afford a pair of upstanding diverging prongs 49.

Integrally formed with the upper ends of the prongs 49 of the rear body support 42 is a pair of apertured anchor lugs 50 and a pair of upstanding screw studs 51 are integrally formed with the prongs 49 on the coupling 47 for the front frame support 42. A straight transverse handle 52 is applied to the prongs 49 of the rear coupling 47 and comprises three sections the intermediate of which is between said anchor lugs. These sections of the handle 52 are rigidly connected and secured to the anchor lugs 50 by a long tie rod 53 which extends through aligned holes in said sections and the apertures in the lugs 50, see Figs. 10 and 11.

A handle comprising two laterally spaced parts for the front frame support 42 comprises two balls 54 secured one to each of the prongs 49 of the front coupling 47 by nut-acting members 55 embeded and rigidly secured in said balls, see Fig. 13. The purpose of forming the handle 54 in two parts will presently appear. Straightening movements of the cross-tie bars 33 to spread the frame bars 30 also spread the bars of each body support 42 and bring said bars into contact with the internal end walls of the couplings 47 and thereby automatically position said couplings with the handles 53 and 54 in rigid horizontal positions.

The chassis is provided with a simple and efficient brake for the rear right hand wheel 34 and which brake is in the form of a short arm 56 arranged to be inserted between the spokes of said wheel, see Figs. 14, 16, 17 and 18. This brake arm 56 is mounted between a pair of horizontally spaced bearing lugs 57 integrally formed on the adjacent coupling member 32 and secured thereto by a horizontal pivot pin 58 for compound vertical swinging movement and horizontal shifting bodily movement on said pivot pin. On the rear edge of the brake arm 56 is a lock lug 59 arranged to enter either one of a pair of lock seats 59' in the rear bearing lug 57 to hold the lock arm 56 either in an operative or inoperative position.

A coiled spring 60 encircling the pivot pin 58 is compressed between the brake arm 56 and front bearing lug 57 and yieldingly holds said arm with its lock lug 59 in one of the lock seats 59' depending on where said arm is set. Formed with the brake arm 56 is a rearwardly projecting finger piece 56' by which said arm may be operated.

Figure 8:
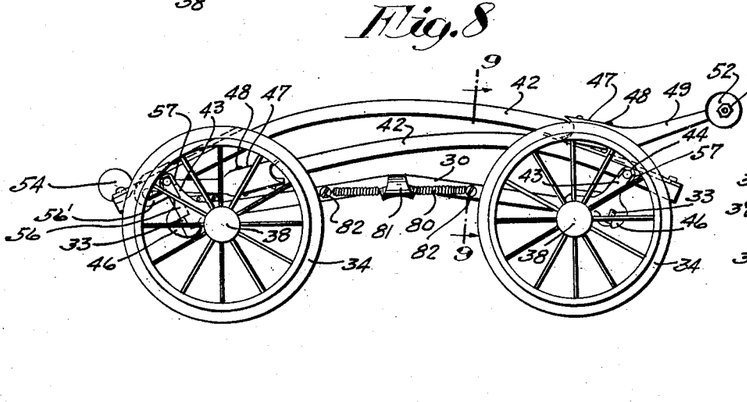
Fig. 8 is a right side elevation of the chassis folded.
Figure 9:
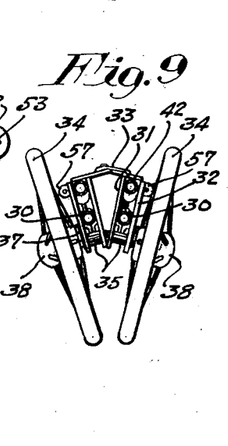
Fig. 9 is a view partly in elevation and partly in section taken on the line 9—9 of Fig. 8.

To fold the chassis it is only necessary to buckle the cross-tie bars 33 to draw the side bars 30 laterally toward each other as well as the wheels of each pair. During this folding movement of the side bars 30 the body supports 42 are folded by the movement of the lower end of their bars toward each other. With the side bars 30 and body supports 42 thus folded, as well as the cross-tie bars 33, the front body support 42 are folded onto the side bars 30 and thereafter the rear body support 42 are folded onto said front body support, see Figs. 8 and 9.

The folding movements of the front and rear body support 42 are accomplished by locating the pivots 44, which connect said body supports to the couplings 31 and 32 above the side bars 30, see Fig. 15. The distance between the handle 54 and the pivotal connections 44 of the respective body support 42 is considerably greater than the length of the side bars 30 and hence it is necessary to form the handle 54 in two laterally spaced parts to permit the rear body support 42 to fold therebetween, see Fig. 8.

Figure 5:
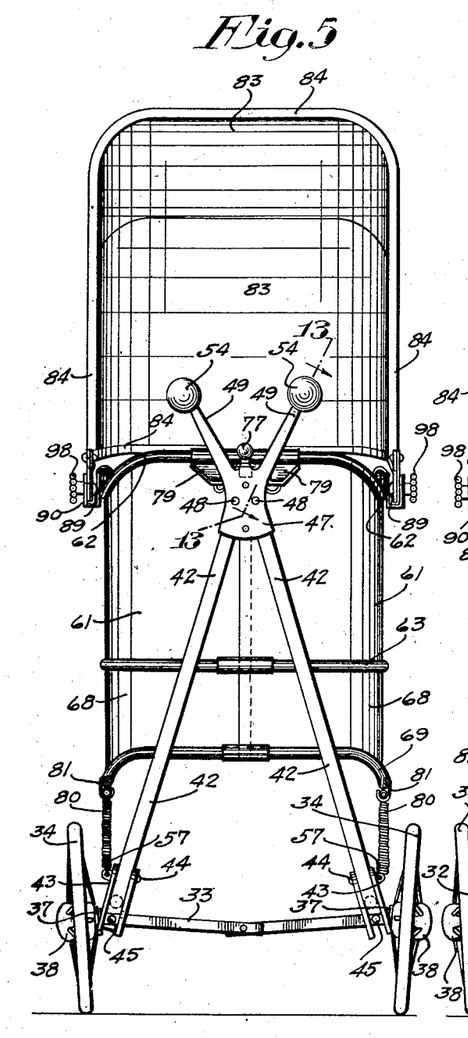
Fig. 5 is a front end elevation of the baby carriage.

By reference to Fig. 5, it will be noted that the cross-tie bar 33 and body support 42 form a triangle that is rigidly braced at its base by the couplings 32, bearing flanges 43 and stop lugs 46 and at its apex by the coupling 47. This triangle arrangement of the cross-tie bar 33 and body support 42 forms a rigid and strong structure which at the same time is very light-weight.

A collapsible flexible body 61 is removably suspended from the couplings 47 and between the two body supports 42. Said body 61 is held to form by upper and lower endless tubular frame members 62 and 63, respectively. The body 61 is attached to the upper frame member 62 by having its upper edge portion inserted into said member through a longitudinally extended slot 64 formed in the under side thereof, folded around a flexible core 65 in said member and secured thereto. A flexible core 66 in the lower frame member 63 affords means by which the body 61 at its lower edge is attached to said frame member and the fastening means between the body 61 and core 66 extends through a longitudinally extended slot 67 in the inner side of the lower frame member 63.

An endless flexible apron 68, forming a depending extension of the body 61, is attached to said body at the frame member 63. At the lower edge of the apron 68 is a tubular endless frame member 69 having substantially the same horizontal contour as the frame member 63. The connector between the apron 68 and frame member 69 is the same as that of the body 61 and upper frame member 62 and the flexible core and slot are indicated by the numbers 70 and 71, respectively.

The body 61 and apron 68 may be made from any suitable fabric or other material and may be of the same color or of different colors. Each frame member 62, 63 and 69 is formed from a single metallic tube of such gauge as to keep its form under the load it must sustain but at the same time having a slight flexibility. The ends of each frame member 62, 63 and 69 are rigidly connected by a coupling sleeve or such other means that will not obstruct the tubular interior of said frame members. Manila rope or a similar material may be used in forming the cores 65, 66 and 70 and after the body 61 and apron 68 are attached thereto said cores are threaded endwise through the respective frame member before the ends thereof are connected, as above stated. The body 61 and apron 68 are secured to the cores 65, 66 and 70 by stitches or other fastening means and held stretched relatively taut by the frame members 63 and 69.

Figures 22, 23, 24, 25, 26, 27:
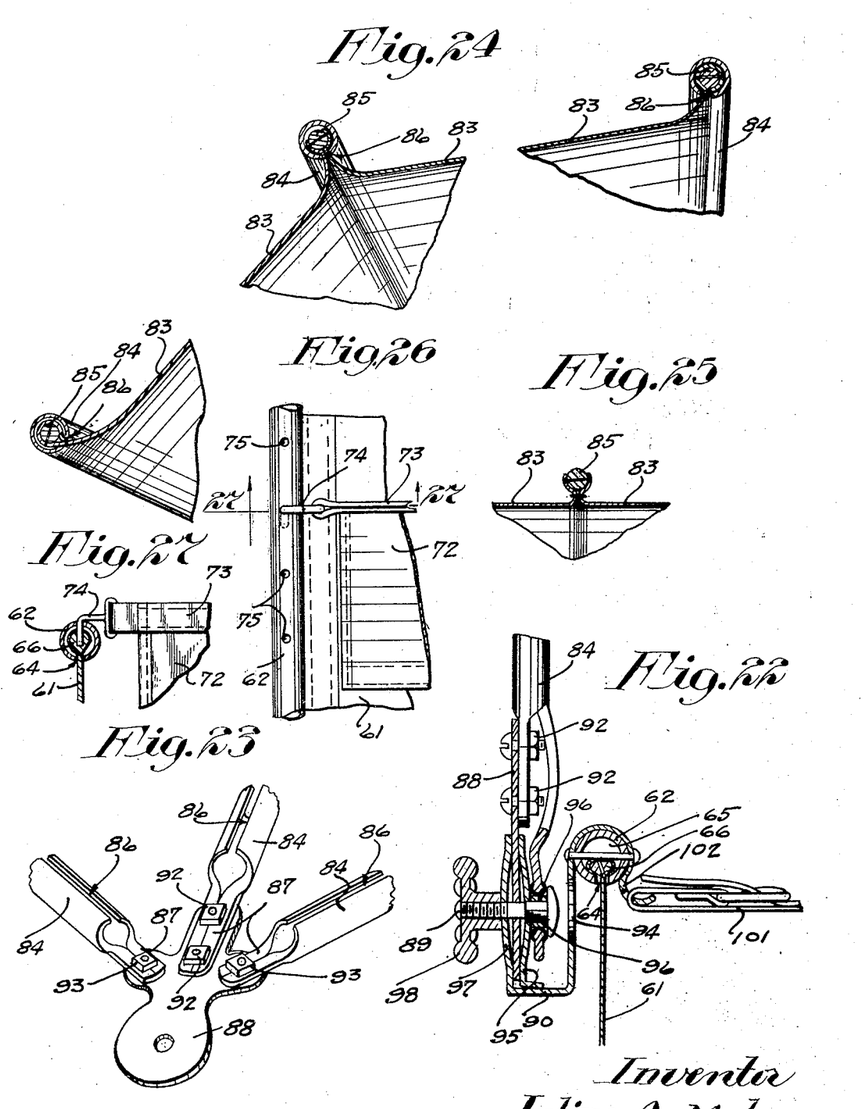
Fig. 22 is a fragmentary detail view with some parts sectioned on the line 22—22 of Fig. 1, on an enlarged scale.
Fig. 23 is a perspective view of one of the bow supports and attached bow connectors.
Fig. 24 is a fragmentary view of the hood in longitudinal vertical section.
Fig. 25 is a fragmentary detail view of the intermediate section of the hood removed from the central bow.
Fig. 26 is a fragmentary plan view of the right side of the body and connected back support.
Fig. 27 is a fragmentary detail view with some parts sectioned on the line 27—27 of Fig. 26.

Within the body 61 is an inclined back support 72 of fabric or other flexible material and having its lower edge portion sewed to the bottom of the body 61. A strap 73 which extends transversely of the body 61 is sewed to the upper edge thereof and has at its ends hooks 74 adapted to be inserted through any one pair of transversely aligned longitudinally spaced holes 75 formed in the top of the frame member 62, see Figs. 26 and 27. Obviously, by adjusting the hooks 74 in the different transversely aligned pairs of holes 75 the inclination of the back support 72 may be varied at will. In applying the hooks 74 in the holes 75 the same are pressed into the cores 65, as shown in Fig. 27. By releasing the hooks 74 from the frame member 62, the back support 72 may be laid flat on the bottom of the body 61 and under the bedding when said body is to be made up for a baby to sleep in.

The body 61 is removably and yieldingly suspended from the body supports 42 by a pair of connectors each of which includes an apertured plate 76. The plates 76 are adapted to be inserted over upstanding head studs 77 formed with the couplings 47 and extending between the prongs 49. Said plates 76 are secured to the intermediate portions of a pair of short horizontal coiled springs 78 which extend transversely of the body 61 and have their ends anchored to the prongs of bifurcated brackets 79 rigidly secured to the frame member 62 at the ends of the body 61, see Figs. 2 and 3. By suspending the body 61 from short horizontal springs 78 relatively heavy springs may be used and at the same time the lateral movements of said springs will be sufficient to give the body 61 the desired spring action.

A pair of stabilizers are provided for cushioning the lateral and longitudinal movements of the body 61 in respect to the chassis. There is one of these stabilizers at each side of the body 61 and each thereof comprises a coiled spring 80 intermediately and detachably secured by a hook-like clip 81 to the respective side of the frame member 69 at the longitudinal center thereof. The end portions of this spring 80 are in diverging relation in respect to the clip 81 and having their ends secured at 82 to the underlying side bar 30, see Fig. 1. By reference to Fig. 4, it will be noted that the clip 81 is attached to the frame bar 69 by being hooked thereover. The stabilizing springs 80 also assist the frame members 63 and 69 in holding the body 61 and the apron 68 taut. To remove the body 61 from the chassis it is only necessary to release the clips 81 from the frame member 69 and the plates 76 from the studs 77.

Removably and adjustably mounted on the body 61 is a hood 83 of flexible material mounted on three tubular bows 84. This hood 83 is attached to the bows 84 in the same manner in which the body 61 is attached to the frame bars 62, 63 and 69 and the cores are indicated by the numeral 85 and the slots in said bows by the numeral 86. The ends of the bows 84 are flattened at 87 and attached to the bearing plates 88 and which plates are pivotally mounted on draw bolts 89 carried by brackets 90 rigidly secured to the sides of the frame member 62 at the longitudinal centers thereof. By reference to Fig. 23, it will be noted that the intermediate bow 84 is rigidly secured to the bearing plate 88 by a pair of bolts 92 and that the outer bows 84 are pivoted thereto by single bolts 93 whereby said outer bows 84 may be folded onto said intermediate bow.

The brackets 90, as one thereof is shown in Fig. 22, are U-shaped in cross-section and the inner side members thereof are rolled more than half-way around the frame member 62 and rigidly secured thereto by rivets. The bearing plates 88 extend between the side members of the brackets 90 in contact with the inner faces of the outer side members of said brackets and the bolts 89 extend through bores in said outer side members and are intermediately supported therefrom. To permit the application of the bolts 89 to the outer side members of the brackets 90 large openings 94 are formed in the inner side members of said brackets. Spring washers 95 are applied to the bolts 89 and bear against the inner face of the bearing plates 88. Also applied to the bolts 89 between their heads and the washers 95 are short spacing sleeves 96. The outer side members of the brackets 90 are outwardly bulged to substantially the same shape as the washers 95 but in reverse order, as indicated at 97, so as to insure a good frictional contact between said side plates and the bearing plates 88.

Hand nuts 98 are applied to the bolts 89 and by tightening said nuts the bearing plates 88 will be frictionally held between the outer side members of the brackets 90 and washers 95 to hold the hood 83 where set. The lower portions of the hood 83 are anchored to the bolts 89 by providing said hood with grommets 98 and mounting the same on the spacing sleeves 96. These spacing sleeves 96 are of such length as to prevent the grommets 98 from being clamped between the heads of the bolts 89 and the washers 95 which would prevent the same from turning during different adjustments of the hood 83 about the axis of the bolts 89. To hold the outer bows 84 spread in respect to the intermediate bow 84 and thereby hold the hood 83 stretched taut between said bows there is provided at each side of the hood 83 a toggle lever 99. The ends of the toggle levers 99 are pivoted to the outer bows 84 and a U-shaped member 100 is attached to each intermediate pivot of the toggle levers 99.

Figures 1, 2, 3, 4:
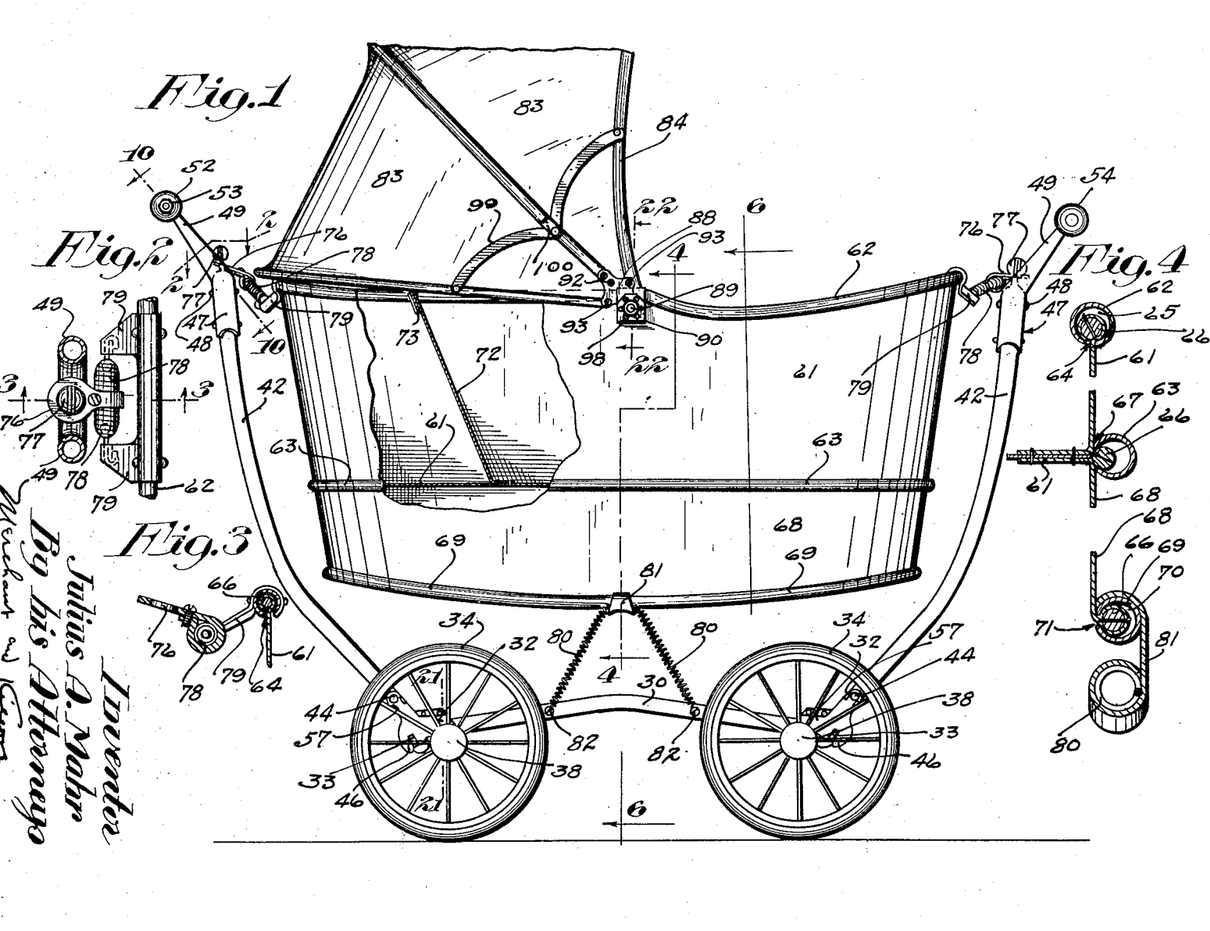
Fig. 1 is a fragmentary side elevation of the folding baby carriage with some parts sectioned.
Fig. 2 is a fragmentary detail view with some parts sectioned on the line 2—2 of Fig. 1, on an enlarged scale.
Fig. 3 is a detail view in section taken on the line 3—3 of Fig. 2.
Fig. 4 is a fragmentary detail view in section taken on the irregular line 4—4 of Fig. 1, on an enlarged scale.

Said U-shaped members 100 are so arranged that the arms of the toggle levers 99 engage the transverse portions of said members during the straightening movements of said levers after their intermediate pivots have passed beyond dead centers to lock the toggle levers 99 with the hood 83 open, see Fig. 1. By buckling the levers 99 the hood 83 may be folded onto the frame member 62. The customary buckle-equipped cross strap 101 is provided to prevent a baby from falling out of the baby carriage and which strap is releasably secured to apertured lips 102 formed with the inner portions of the brackets 90.

Figure 6:
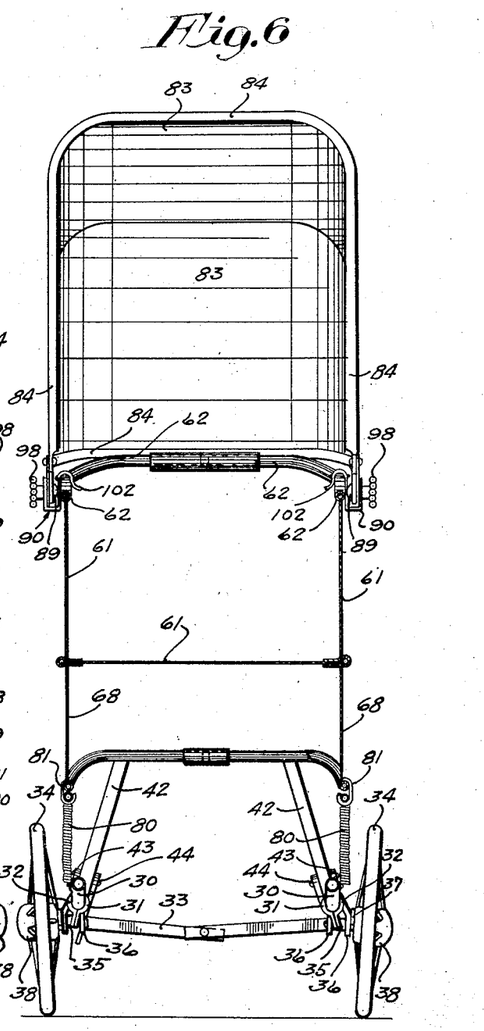
Fig. 6 is a view partly in front end elevation and partly in transverse vertical section taken on the irregular line 6—6 of Fig. 1.
Figure 7:
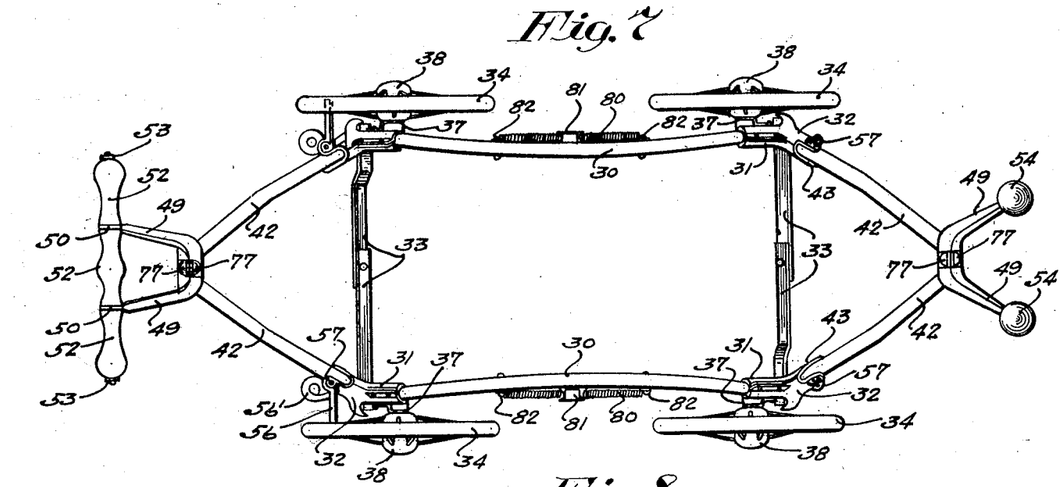
Fig. 7 is a plan view of the chassis with the body removed.

The above described folding baby carriage may be very quickly folded or set up and when folded, occupies a very compact space and may be easily carried. Said carriage when set up is rigid and at the same time of lightweight and by rigidly securing the wheel spindles 35 to the side bars 30 of the chassis the wheels 34 will always remain in proper alignment so that the carriage will roll in a straight course. By reference to Figs. 5 and 6, it will be noted that the spindles 35 are positioned to give the wheels 34 the proper toe in for well known reasons. The springs 79 and stabilizers 80 have such tension as to cause the body 61 to have easy riding qualities, prevent undue swaying of the body 61 and absorbs all shock caused by the wheels 34 traveling over rough or uneven surfaces.

What I claim is:

1. A folding chassis comprising a pair of longitudinally extended side bars, couplings on the ends of the side bars and having fixed spindles, wheels journaled on the spindles, body supports attached to the couplings, and toggle-acting cross-tie bars pivotally attached to the body supports and operable to either spread the side bars or fold the same.

2. The structure defined in claim 1 in further combination with stop lugs on the couplings arranged to limit the movements of the cross-tie bars to spread the side bars and position the cross-tie bars with their intermediate pivots slightly beyond dead centers.

3. The structure defined in claim 1 in further combination with a pair of reversely extended hook-like lugs on each coupling and arranged one on each side of the pivotal connection of the respective cross-tie bar and with which lugs said cross-tie bar interlocks when the side bars are spread to rigidly connect the side bars and cross-tie bars in rectangular arrangement.

4. A folding chassis comprising a pair of longitudinally extended side bars, couplings on the ends of the side bars, wheels mounted on the side bars, cross-tie members connecting the couplings on the side bars and operable to either spread or fold the side bars, and body supports connected to the couplings for folding movements onto the side bars when folded.

5. A folding chassis comprising a pair of longitudinally extended side bars, couplings on the ends of the side bars, wheels mounted on the side bars, a pair of upright body supports one at each end of the chassis and each comprising a pair of bars the lower ends of which are pivoted to the couplings at the respective end of the chassis, a coupling hingedly connecting the upper ends of the bars of each body support, and a cross-tie member connecting the couplings at each end of the side bars and operable to either spread or fold the side bars.

6. The structure defined in claim 5 in which the pairs of body supports are arranged to fold the one upon the other and on the side bars when folded.

7. The structure defined in claim 5 in which the bars of each body support when spread hold the hinge-acting couplings against pivotal movement on said bars and in turn hold said bars against pivotal movement in respect to said couplings.

8. A folding chassis comprising a pair of longitudinally extended side bars, couplings on the ends of the side bars, wheels mounted on the side bars, a pair of upright body supports one at each end of the chassis and comprising pairs of upwardly converging bars hingedly attached at their lower ends to the couplings for folding movement onto the side bars when folded, the bars of each body support being pivotally connected at their upper ends, and toggle-acting cross-tie bars connecting the side bars by having their ends pivotally attached to the bars of the body supports, said cross-tie bars when straight having interlocking engagement with the couplings to hold the body supports against folding movement onto the side bars.

9. The structure defined in claim 8 in which the bars of the body supports and cross-tie bars are in triangular arrangement.

10. A folding chassis comprising a pair of longitudinally extended side bars, couplings on the ends of the side bars, wheels mounted on the side bars, a pair of upright body supports one at each end of the chassis and comprising pairs of upwardly converging bars hingedly attached at their lower ends to the couplings for folding movement onto the side bars when folded, the bars of each body support being pivotally connected at their upper ends, and toggle-acting cross-tie bars connecting the side bars by having their ends pivotally attached to the bars of the body supports, a pair of stop lugs on each coupling, the stop lugs of the several pairs being in the form of reversely extended hooks located one on each side of the pivotal connections between the cross-tie bars and couplings, said cross-tie bars when straight having interlocking engagement with the stop lugs to hold the body supports in operative positions.

11. A folding chassis comprising a pair of longitudinally extended side bars, couplings on the ends of the side bars, wheels mounted on the side bars, a pair of upright body supports one at each end of the chassis, each body support comprising a pair of bars having their lower ends pivoted to the couplings at the respective end of the chassis, handle couplings to which the upper ends of the bars of the body supports are pivotally attached, a handle applied to each handle coupling, one of said handle couplings and its handle being bifurcated to receive the bars of the body support to which the other handle coupling is attached when the body supports are folded.

12. The structure defined in claim 5 in further combination with means on the couplings at the upper ends of the body supports for suspending a body therefrom.

13. The structure defined in claim 5 in which the coupling hingedly connecting the upper ends of the bars of each body support is in the form of a shell having an open lower end into which said bars extend.

14. The structure defined in claim 5 in which the coupling hingedly connecting the upper ends of the bars of each body support is in the form of a two-part pressed metal shell the sections of which are rigidly connected, said shell having an open lower end into which the upper end portions of said bars extend.

In testimony whereof I affix my signature.
JULIUS A. MAHR.